United States Patent Office 3,166,421

Patented Jan. 19, 1965

3,166,421

METHOD AND COMPOSITION FOR DEVELOPING LITHOGRAPHIC PLATES

Charles Gramlich, Highland Park, Ill., assignor to American Zinc Institute, Inc., New York, N.Y., a corporation of New York No Drawing. Filed June 29, 1961, Ser. No. 120,507
3 Claims. (Cl. 96—49)

This invention relates to lithography, and more particularly to the development of the photographic image on an exposed plate.

Within recent years a new process for the preparation of lithographic printing plates has been developed. In this new process, the light-sensitive coating is wiped on the surface of the metal lithographic plate by hand instead of applying it in a conventional plate whirler. The light-sensitive coatings for this "wipe-on" process are usually a solution of a water-soluble, light-sensitive diazo resin. Typical diazo resins are Diazo Resin No. 4 supplied by Fairmont Chemical Co., Inc., of Newark, New Jersey, and Diazo X supplied by Azoplate Corporation of Murray Hill, New Jersey. These are both formaldehyde condensation products of paradiazo diphenylamine.

Until recently, the diazo wipe-on coatings have been applied almost exclusively to aluminum lithographic plates. After the coating has been dried on the plate, it is exposed to a strong source of light, such as an arc light, through a negative. This produces a chemical change in the diazo material which is exposed to the light, so that it becomes insoluble in the developer solution which is subsequently applied to the plate. These light exposed areas then become the image or printing areas of the lithographic plate.

With wipe-on coatings on aluminum plates, two methods of processing the plates have heretofore been used. In one method, which can be termed the conventional or two-step method, the plate is covered with a developing ink after it has been exposed to light. After drying the ink on the plate, the plate is developed out with a water solution, usually acid in nature. This dissolves the diazo coating which has not been exposed to light. The light-exposed diazo coating, covered with developing ink, remains on the plate to form the printing area of the plate.

In the second method used on aluminum plates, which may be termed a one-step method, an emulsion of water and a lacquer is used as a single solution. This emulsion removes the diazo coating from the non-printing areas and deposits a film of lacquer on the printing area at the same time.

When an attempt was made to produce diazo wipe-on lithographic plates on zinc, it was found that the emulsion of water and lacquer was not satisfactory. It was impossible to develop the plates without leaving a deposit of lacquer on the non-printing areas of the plate as well as the printing areas.

The conventional method described above can be used on zinc plates but it is not entirely satisfactory. Many developing inks were tested but the ones which allowed removal of the diazo coating from the non-printing areas of the plate produced a thin gray deposit on the printing areas instead of a desired heavier black deposit which is more receptive to ink on the press.

General objects of the present invention are to overcome one or more of the shortcomings of prior practices; and to provide an improved one-step system for developing lithographic plates.

According to the present invention the problems in the preparation of a satisfactory diazo wipe-on lithographic plate on zinc were solved by the development of an emulsion of water and ink.

With this emulsion of water and ink according to this invention, it is possible to remove the diazo coating from the non-printing areas of the plate, treat the said non-printing areas so they become "water-receptive" instead of "ink-receptive," and ink the printing areas of the plate all at the same time. Furthermore, the film of ink which deposits on the printing areas is heavy and black so that these areas accept press ink almost immediately when the plate is started on the press. In this respect this emulsion of water and ink is far superior to the developing inks which have been in common use.

According to the invention, it has been found that this emulsion of water and ink is suitable not only for the development of a diazo type of light-sensitive coating on zinc plates, but is also very satisfactory for the development of a similar type of coating on aluminum plates and on stainless steel plates.

To make a satisfactory emulsion of ink and water for use as a developer of lithographic plates, several requirements must be met.

The water phase must dissolve the part of the light-sensitive coating which was not exposed to light. The commonly used diazo resins are soluble in water, so this requirement is satisfied.

The ink in the emulsion must not be allowed to deposit on the non-printing areas of the plate. In this new emulsion, this is accomplished by the incorporation of a water-soluble, hydrophilic gum in the water phase, acidified to improve its ability to adsorb onto the metal in the non-printing areas and render these areas "water-receptive."

The adsorbed water soluble gum forms a film which adheres to the non-print areas and does not dissolve off. This film desensitizes the plate; that is to say, it makes the non-print areas insensitive to the developer ink and to the printing press ink.

Gums of this type include gum arabic; sodium carboxymethyl cellulose (commonly called CMC); and the copolymer of methyl vinyl ether and maleic anhydride (commonly called PVM/MA). Other hydrophilic gums, which are able to lay down a water-receptive film suitable for making lithographic plates may also be used.

For example, it has been possible to make satisfactory ink and water emulsion, using a concentration of 1 to 5% PVM/MA in the water phase; it has also been possible to make a satisfactory ink and water emulsion using a concentration of 1 to 5% sodium carboxymethyl cellulose in the water phase. It has also been possible to use a mixture of gum arabic, tannic acid and chrome alum in the water phase.

The pH of the water phase of these emulsions may be varied widely from about 2.0 to about 8.5. The acid solutions are preferably made with phosphoric acid, but other acids such as hydrochloric acid may be used.

The ink used, in a good ink and water emulsion developer, must meet certain requirements also.

It should not be too soft or too stiff. It should not dry after it has been deposited on the printing areas of a lithographic plate, that is to say, the ink should contain no drying oil vehicle or drier, thus to insure that these areas remain permanently "ink-receptive" to the printing press ink. (A dried ink is usually not as ink-receptive as a wet ink.)

Furthermore, the ink must adhere well to the light-hardened areas of the diazo coating, so as to render these areas completely ink-receptive.

Finally, the ink with all these properties must be capable of being converted into an emulsion with water.

It has been found that inks comprised primarily of a mineral oil, a hydrocarbon terpene resin and a suitable pigment, pigment wetting agent, and toner are highly satisfactory for this application. The viscosity of the mineral oil and the relative amounts of mineral oil and terpene resin may be varied over wide limits without affecting the proper operation of the final ink water emulsion.

As a specific example, a developer ink having the following composition has been successfully used. This ink contains about 16% carbon black pigment, about 2% of an iron blue toner, about 2% of a pigment wetting agent, about 18% of mineral oil, and about 62% of a vehicle which consists of about 40% mineral oil and about 60% of a hydrocarbon terpene resin. This ink is the specific ink used in the examples given in Tables I and II below. Other ink formulations that meet the above requirements have also been used.

In order to obtain an emulsion of ink and water it is necessary to employ an emulsifying agent. Some of the emulsifiers which have proved to be satisfactory are mixtures of a "Span" and "Tween." These are non-ionic emulsifiers produced by Atlas Powder Co.

As disclosed in Atlas literature, the several Spans and Tweens are trade names for the compounds as indicated below:

Span 20 is sorbitan monolaurate. Span 60 is sorbitan mono stearate. Span 85 is sorbitan trioleate.

Tween 20 is polyoxy ethylene sorbitan monolaurate. Tween 60 is polyoxy ethylene sorbitan mono stearate. Tween 85 is polyoxy ethylene sorbitan trioleate.

The "Tweens" are hydrophilic and the "Spans" are lipophilic. By mixing them in various proportions different properties can be obtained.

Mixtures which have been used successfully include Span 20 and Tween 20; Span 60 and Tween 60; and Span 85 and Tween 85. The concentration of the Span may be varied from about 2% to about 5%; the concentration of the Tween may be varied from about 0.5% to about 2.25%; in each case the percent range is a percent of the entire water-ink emulsion.

Other emulsifiers having similar properties may also be used. For example, it has been possible to produce sucessful emulsions with Ethoduomeen T/13 and with Armeen 16D.

Both emulsifiers are products of Armour Industrial Chemical Company of Chicago, Ill., and are well described in literature furnished by that company. The Ethoduomeens (trademark of the Armour Industrial Chemical Company) denote the reaction product of an amine and ethyleneoxide. Such product contains two amine groups and is cationic in nature. The Armeens (trademark of the Armour Industrial Chemical Company) are the aliphatic amines of organic bases. Ethoduomeen T/13 is a C18 fatty diamine; Armeen 16D is a C18 fatty amine.

The method of compounding the emulsion is also important. No emulsion is obtained if the ink is added to the water solution. The water solution must be added to the ink as explained below.

The emulsifying agent is first dissolved in the ink to form the ink phase. The ink (with the emulsifying agent dissolved in it is heated to about 70° C. (160° F.). The water phase containing water, the hydrophilic gum and acid is also heated to about 70° C. (160° F.). Then the ink is stirred and, while it is being stirred, the water solution is gradually added to it. Following the complete addition of the water solution, the emulsion is stirred for a few minutes and is then allowed to cool.

Tests show it is possible to vary the percentage of the water phase from about 65% to 91%, the balance of the emulsion being the ink phase.

Several specific examples of water-ink emulsion developers which have given excellent results in practice are set forth in the following tables:

*Table I*

| | Percent by weight |
|---|---|
| Ink | 8.2 |
| Span 60 | 3.3 |
| Tween 60 | 0.8 |
| CMC | 0.9 |
| Phosphoric acid | 0.2 |
| Water | 86.6 |
| | 100.0 |

*Table I*—Continued

*Table II*

| | |
|---|---|
| Ink | 9.9 |
| Span 60 | 4.0 |
| Tween 60 | 1.0 |
| CMC | 2.4 |
| Phosphoric acid | 0.3 |
| Water | 82.4 |
| | 100.0 |

To show more clearly how the development step of the invention fits into the overall operation of preparing a lithographic printing plate for the press, one overall method will be described for purposes of illustration.

The metal plate of zinc, aluminum or stainless steel is first grained to give it a very fine dull matte grain, free of scratches and graining mud. The grained plate should not be counter-etched.

The plate is then coated with the water soluble light-sensitive diazo resin. This coating should be done by hand instead of applying the coating in a conventional plate whirler. The application by hand is sometimes called the "wipe-on" process.

To apply the coating a clean cellulose sponge is used, one that has never been used as a gum sponge. The clean sponge should first be washed with water and the excess water squeezed out of it. Then some of the coating should be poured on the sponge.

The coating material should not be poured directly on to the plate as this is liable to cause a "hot-spot." The sponge containing the coating should be rubbed rapidly over the grained plate. It is best to rub over the entire plate in one direction, then at right angles to this direction, and then again in the first direction. After the coating has been smoothed as much as possible, it should be fanned dry.

The sensitized coated plate is then exposed in the usual manner through a negative. After exposure the plate is developed with the water-ink developer emulsion above described.

Although the emulsifying agent helps to prevent separation of the ink and water phases during storage, it is desirable, before use, to shake the container holding the developer emulsion, or to stir the developer emulsion, so as to be certain that it is thoroughly mixed.

Sufficient emulsion should be poured on the plate to wet the plate over the entire surface but too much should not be used. The entire plate should be rubbed up so the image or printing areas can be seen through the emulsion.

After the plate is thoroughly treated by the developer emulsion, as a final step, the excess emulsion should be removed from the plate and the plate gummed with a 6.5° Baumé gum arabic solution. The plate is finished and ready for the printing press.

The following are some of the advantages of the invention:

It is a one-step developing process. This means a saving in time by eliminating the separate inking and developing steps referred to above in the conventional or two-step method.

Furthermore, the new developing method can be used with the three metals most commonly used for lithographic plates, viz. zinc, aluminum and stainless steel. It works especially well on zinc which has many other properties desirable for lithographic purposes.

The new developer emulsion removes the unexposed coating from the non-printing areas; it desensitizes these areas to the printing press ink and makes them receptive to printing press water. It effectively rubs up the printing areas, making them receptive to the printing press ink, and unreceptive to printing press water.

The process produces a plate in which the ink-receptive printing areas and the water-receptive non-printing areas are clearly defined and which produce clear impressions on the paper when used in the printing press.

While certain novel features of the invention have been disclosed herein, and are pointed out in the annexed claims, it will be understood that various omissions, substitutions and changes, in accordance with the doctrine of equivalents, may be made by those skilled in the art without departing from the spirit of the invention.

What is claimed is:

1. A developer for exposed diazo resin sensitized zinc, aluminum or stainless steel plates upon which the resin has been applied by the wipe-on process, said developer consisting essentially of a water oil emulsion having hydrophilic and lipophilic properties and consisting essentially of (a) an emulsifier-stabilizer, (b) an oily non-drying developer ink phase constituting from 9–35% of the emulsion and consisting essentially of a pigment, a non-drying mineral oil and a hydrocarbon terpene resin, and (c) a water phase constituting the remainder of the emulsion in which is dissolved in the water of said phase, a component consisting essentially of a gum having hydrophilic action, said gum being selected from the group: sodium carboxymethyl cellulose, gum arabic, copolymer of methyl vinyl ether and maleic anhydride.

2. A developer according to claim 1 containing as said stabilizer a mixture containing a hydrophilic compound selected from the group: polyoxy ethylene sorbitan monolaurate, polyoxy ethylene sorbitan monostearate, polyoxy ethylene sorbitan trioleate and a lipophilic compound selected from the group: sorbitan monolaurate, sorbitan monostearate, sorbitan trioleate.

3. In the method of developing lithographic plates made from zinc, aluminum or stainless steel, having thereon a light-sensitive coating of a water-soluble diazo resin applied thereon by the wipe-on process, the step of applying to said plate after imagewise exposure thereof, a developer as set forth according to claim 1.

References Cited in the file of this patent

UNITED STATES PATENTS

| | | |
|---|---|---|
| 1,789,138 | Glaser | Jan. 13, 1931 |
| 1,992,965 | Rowell | Mar. 5, 1935 |
| 2,692,827 | Brinnick et al. | Oct. 26, 1954 |
| 2,865,873 | Hodgins et al. | Dec. 23, 1958 |
| 3,019,105 | Adams | Jan. 30, 1962 |

OTHER REFERENCES

Chemistry of Lithography, Hartsuch, Lithographic Technical Foundation, Inc., New York 1961, page 197.